United States Patent [19]

Timmerman et al.

[11] Patent Number: 4,828,927

[45] Date of Patent: May 9, 1989

[54] SHEET OR WEB CARRYING AN ANTISTATIC LAYER

[75] Inventors: Daniël M. Timmerman, Mortsel; August M. Mariën, Oevel; Jan E. Van Havenbergh, Zwijndrecht; Etienne A. Van Thillo, Essen, all of Belgium

[73] Assignee: Agfa-Gevaert, N.V., Mortsel, Belgium

[21] Appl. No.: 40,822

[22] Filed: Apr. 21, 1987

[30] Foreign Application Priority Data

May 26, 1986 [EP] European Pat. Off. ............ 86200913

[51] Int. Cl.$^4$ ..................... B32B 27/08; B32B 27/36
[52] U.S. Cl. ................................. 428/480; 428/483; 428/913; 430/527; 430/529; 430/533; 430/535; 430/634
[58] Field of Search ............... 428/480, 483, 913; 430/535, 527, 529, 533, 634; 346/135.1

[56] References Cited

U.S. PATENT DOCUMENTS

| | | | |
|---|---|---|---|
| 3,988,157 | 10/1976 | Van Paesschen et al. | 430/535 |
| 4,089,997 | 5/1978 | Van Paesschen et al. | 430/533 |
| 4,268,623 | 5/1981 | Sera et al. | 430/529 |
| 4,304,852 | 12/1981 | Sugimoto et al. | 430/529 X |
| 4,478,907 | 10/1984 | Van Gossum et al. | 428/480 X |
| 4,636,442 | 1/1987 | Beavers et al. | 428/480 |

*Primary Examiner*—Thomas J. Herbert
*Attorney, Agent, or Firm*—A. W. Breiner

[57] ABSTRACT

A sheet or web comprising a substrate which is composed of or coated with a hydrophobic resin and carries an antistatic layer, characterized in that the antistatic layer consists essentially of a blockcopolyetherester of dibasic carboxylic acid(s) esterified with ethylene glycol and with a polyoxyethylene glycol having an average molecular weight in the range 1,000 to 10,000, at least 20% by weight of such blockcopolyetherester being constituted by polyoxyethylene-ester chain parts.

12 Claims, No Drawings

SHEET OR WEB CARRYING AN ANTISTATIC LAYER

DESCRIPTION

The present invention relates to a sheet or web comprising a substrate which is composed of or coated with a hydrophobic resin and carries an antistatic layer.

The invention is particularly but not exclusively concerned with recording materials wherein such a sheet or web carries a recording layer, e.g. a light-sensitive silver halide layer.

It is known that sheets and webs of low conductivity, e.g. sheets and webs of resin or resin-coated paper, readily become electrostatically charged by friction with dielectric materials and/or contact with electrostatically chargeable transport means, e.g. rollers. The charging occurs particularly easily in a relatively dry atmospheric environment.

Sheets and webs of hydrophobic resin are commonly used as supporting substrates of recording materials. Such substrates are subjected to frictional contact with other elements during the manufacture of the recording materials, e.g. during a coating or cutting stage, and during use, e.g. during the recording of information or (in the case of silver halide photographic materials) during image-processing or final image inspection or projection. Especially in the reeling-up or unreeling of dry photographic film in a camera or projector high friction may build up, resulting in electrostatic charges that may attract dust or cause sparking. In unprocessed photographic silver halide emulsion materials sparking causes developable fog and degrades the image quality.

In order to reduce electrostatic charging of sheets or webs comprising a hydrophobic resin layer or support, e.g. a polyethylene layer on paper or a cellulosetriacetate or polyethylene terephthalate resin support, it is known to apply coatings which are formed of or incorporate ionic compounds. In some light-sensitive materials, such ionic compounds are incorporated in a silver halide emulsion layer. In order to avoid diffusion of ionic compounds out of the silver halide emulsion during its different wet processing treatments, preference has been given to antistatic high molecular weight polymer compounds having ionic groups at frequent intervals in the polymer chain (ref. Photographic Emulsion Chemistry, by G. F. Duffin,—The Focal Press—London and New York (1966)—Focal Press Limited, p. 168.

Ionic polymers containing carboxylate groups have good antistatic properties in the pH range above 6, but fail because of their low dissociation degree at lower pH values.

Ionic polymers containing sulphonic acid grops or a salt form thereof interact with amino groups of proteinaceous colloids at pH values above 4.5 and, if incorporated into coating solutions containing such colloids, cause a considerable increase in viscosity of the coating solutions and even flocculation thereof.

Ionic polymers containing protonated or quaternized amino groups, although being good antistatic agents are often useless in photographic silver halide emulsion materials because of their fogging activity. This can be counteracted by using substantial amounts of anti-fogging agents, but only at the expense of photographic sensitivity. Moreover, such ionic polymers are not compatible with the use of anionic wetting agents as often used in the coating composition of such materials because the cationic part of said polymers interact with the wetting agents and form large complex compounds having little or no antistatic effect.

It has been established also that the dissociation of ionic type antistatic polymers is strongly dependent on the water content of the elements wherein they are incorporated.

It is known from Acta Polymerica 35 (1984) Nr. 4, p. 309–315 to use blockcopolyetherester compounds for providing a permanent antistatic character to polyacrylonitrile fibers. For that purpose the polyacrylonitrile is dissolved together with the blockcopolyetherester in a mixture of dimethyl formamide and water and coextruded in a non-solvent coagulation liquid to form antistatic fibers. The most suitable of such antistatic compounds are said to be those containing 80–85% of esterified polyethyleneglycol. The preparation of the blockcopolyetherester proceeds by condensation in the melt of an oligomer-free bis-(beta-hydroxyethyl)-terephthalate in admixture with a polyoxyethylene glycol of a molecular weight e.g. in the range of 1,000 to 10,000. Hereby through re-esterification and polycondensation structural blocks of repeating units of terephthalic acid esterified with ethylene glycol and with polyoxyethylene glycol are obtained.

It has been found that certain blockcopolyetheresters afford particular advantages if used to form or as ingredients of antistatic layers in webs or sheets comprising a substrate which is formed of or coated with a hydrophobic resin. Unlike the ionic compounds hitherto incorporated in such webs or sheets of antistatic purposes, suitably selected blockcopolyetheresters can be used to form antistatic layers whose surface resistivity is not substantially affected by exposure to acid or alkaline media. Moreover such layers can be provided in photographic sheets or webs incorporating silver halide emulsion layers without adversely affecting the photographic sensitivity.

According to the present invention, there is provided a sheet or web comprising a substrate which is composed of or coated with a hydrophobic resin and carries an antistatic layer, characterised in that the antistatic layer consists essentially of a blockcopolyetherester of dibasic carboxylic acid(s) esterified with ethylene glycol and with a polyoxyethylene glycol having an average molecular weight in the range 1,000 to 10,000, at least 20% by weight of such blockcopolyetherester being constituted by polyoxyethylene-ester chain parts.

The surface resistivity of antistatic layers as used according to the invention depends on the proportion of oxyethylene groups therein. By increasing this proportion the surface resistivity of the layer can be reduced. However, an increase in the proportion of oxyethylene groups tends to make the layer less capable of good adherence to a hydrophobic substrate. Therefore in the preparation of a blockcopolymer for use according to the invention in the production of a web or sheet, the proportion of hydrophilic groups should be controlled with regard not only to the required antistatic properties but also to the composition of the surface or surfaces to which the antistatic layer is to be applied. If the antistatic layer is to be applied directly to the hydrophobic resin substrate, i.e. without an intervening less hydrophobic subbing layer, the proportion of the blockcopolyetherester which is constituted by the polyoxyethylene-ester cannot be so high it could otherwise be.

In preferred embodiments of the invention the polyoxyethylene-ester chain parts of the blockcopolymer constitute at least 75% by weight of such copolymer.

An important use for the invention is in the manufacture of webs or sheets having a polyethylene terephthalate resin support. Preferred antistatic copolymers for direct application to a substrate of that resin are those prepared from terephthalic or isophthalic acid or mixtures thereof.

Depending on the sequence length of the polyoxyethylene blocks and the content thereof watersoluble or waterinsoluble blockcopolyetheresters are obtained.

The waterinsoluble products can be applied in dispersed form in hydrophilic colloid layers either by the use of dispersing agents and/or by incorporating in the structure of the blockcopolyetheresters small amounts of ionic groups, e.g. sulpho groups in salt form. For example, from 5 to 10 mole % of the dibasic carboxylic acid or derivative thereof used in the production of the polyester part of the blockcopolyetherester can carry sulpho groups in salt form, preferably in the sodium salt form. For the improvement of dispersability in aqueous medium the blockcopolyetherester synthesis is preferably carried out with a minor amount of the 5-sulphonic acid sodium salt of isophthalic acid or its dimethyl ester derivative.

For increasing the glass transition temperature (Tg) of the blockcopolyetherester and to reduce its stickiness, e.g. when a large amount of isophthalic acid is used as dicarboxylic acid, it is advantageous that a part of the ester groups, e.g. 0.05 to 1 mole % is derived from polycarboxylic acid(s) having at least three carboxylic acid groups. Preferably these acids are aromatic carboxylic acids containing at least four carboxylic acid groups not capable of forming intermolecularly an anhydride as described in U.S. Pat. No. 4,478,907.

Particularly useful polycarboxylic acids for increasing the Tg-value in the blockcopolyetheresters used according to the present invention correspond to the following general formula including the corresponding esters:

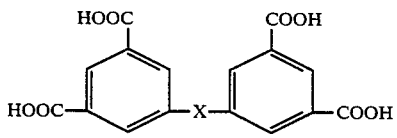

wherein X represents a chemical bond or a bivalent atom or bivalent group of atoms e.g. oxygen, alkylene such as methylene, carbonyl, sulphonyl, —NHSO$_2$—, —NHCONH— or a —NH—Q—Y—Q—NH—group wherein Q represents carbonyl or sulphonyl and Y represents a bivalent organic group e.g. a bivalent aliphatic or aromatic group. The carboxylic acid groups can be introduced on aromatic nuclei which are already linked by X, using techniques known in the art. Alternatively, the aromatic nuclei can be linked by the X group after the carboxylic acid or ester group substituents have been incorporated on such nuclei. The linking of such nuclei can be effected by a condensation reaction starting from 5-amino-isophthalic acid or its corresponding lower alkyl ester e.g. dimethyl ester and the appropriate acid chloride to yield the bivalent X bond.

Although ethylene glycol is preferably used as the sole monomeric diol in the preparation of the present blockcopolyetherester minor amounts (e.g. up to 5 mole %) of other monomeric diols may be used with the proviso that the product involved still posesses antistatic activity. Exemplary monomeric diols other than ethylene glycol and of which said minor amounts may be used are diethylene glycol, 1,3-propanediol, 1,4-butanediol, 2-methyl-1,5-pentanediol, neopentylglycol, 1,4-cyclohexanedimethanol, norcamphanediols, p-xylene glycol and corresponding alkyl esters thereof.

The blockcopolyetherester compounds used according to the present invention can be prepared by techniques known to those skilled in the art, e.g. a trans-esterification is carried out under nitrogen atmosphere and the polycondensation in the melt under reduced pressure. In the trans-esterification preferably the methyl ester of the dicarboxylic acids is used, whereas the polycondensation can start directly with the ethylene glycol monoester of said dicarboxylic acids.

To illustrate the preparation of blockcopolyetheresters for use according to the present invention the following preparations are given.

PREPARATION 1

Blockcopolyetherester of terephthalic acid with 50 mole % of polyesterified ethylene glycol and 50 mole % of polyesterified polyoxyethylene glycol, wherein the polyoxyethylene-ester part represents 95.56% by weight of the blockcopolyetherester.

In a reaction tube provided with a distillation condensor and a stirring system were introduced 40 g (0.01 mole) of polyoxyethylene glycol of average molecular weight (A.M.W.) 4,000, 5.08 g (0.02 mole) of bis-(beta-hydroxyethyl)-terephthalate (BHET) and 10 mg of Ti(OOC-phenylene-COOCH$_3$)$_4$ as trans-esterification and polycondensation catalyst.

The mixture was melted by heating to 280° C. After obtaining a homogeneous melt the reaction mixture was kept for 3 h under reduced pressure (0.5 mm Hg) for distilling off ethylene glycol freed in the polycondensation.

A pale brown coloured substance was obtained. The inherent viscosity of a 0.5 wt% solution measured at 25° C. in a mixture of phenol and orthochlorobenzene (60/40 by volume) was 1.2 dl/g.

PREPARATION 2

Blockcopolyetherester of terephthalic acid with 75 mole % of polyesterified ethylene glycol and 25 mole % of polyesterified polyoxyethylene glycol, wherein the polyoxyethylene-ester part represents 87.76% by weight of the blockcopolyetherester.

The same procedure as applied in Preparation 1 was followed operating however with 10.16 g (0.04 mole) of BHET instead of 0.02 mole BHET.

The inherent viscosity of a 0.5 wt% solution measured at 25° C. in a mixture of phenol and orthochlorobenzene (60/40 by volume) was 1.25 dl/g.

PREPARATION 3

Blockcopolyetherester of terephthalic acid with 87.5 mole % of polyesterified ethylene glycol and 12.5 mole % of polyesterified polyoxyethylene glycol, wherein the polyoxyethylene-ester part represents 75.45% by weight of the blockcopolyetherester.

The same procedure as applied in Preparation 1 was followed operating however with 30 g (0.0075) of said polyoxyethylene glycol and 15.24 g (0.06 mole) of BHET.

The inherent viscosity of a 0.5 wt% solution measured at 25° C. in a mixture of phenol and orthochlorobenzene (60/40 by volume) was 1.22 dl/g.

PREPARATION 4

Blockcopolyetherester prepared from:
53 mole % of terephthalic acid,
40 mole % of isophthalic acid,
7 mole % of 5-sulpho-isophthalic acid sodium salt,
87.5 mole % of ethylene glycol, and
12.5 mole % of polyoxyethylene glycol (A.M.W.: 4,000)

The polyoxyethylene-ester part represents 75.19% by weight of the blockcopolyetherester.

In a reaction tube provided with a distillation condenser and a stirring system were introduced:
6.17 g (0.0318 mole) of dimethylterephthalate,
4.66 g (0.024 mole) of dimethylisophthalate,
1.24 g (0.0042 mole %) of 5-sulpho-isophthalic dimethylester sodium salt,
8.18 g (0.132 mole) of ethylene glycol, and
10 mg of $Ti(OOC\text{-phenylene-}COOCH_3)_4$ The mixture was heated for 2 h at 196° C. under nitrogen atmosphere. During the trans-esterification reaction methanol was distilled off. Thereupon 30 g (0.0075 mole) of polyoxyethylene glycol (A.M.W.: 4,000) was added. The temperature was raised to 255° C. in a period of 30 min and kept at that temperature for 15 min while maintaining the reaction mixture under $N_2$-atmosphere. The polycondensation was continued under reduced pressure lower than 0.5 mm Hg at 282° C. for a period of 30 min to 3 h depending on the viscosity of polymer desired.

A milky white to pale brown coloured substance was obtained. The inherent viscosity of a 0.5 wt% solution measured at 25° C. in a mixture of phenol and orthochlorobenzene (60/40 by volume) was 1.06 dl/g.

PREPARATION 5

Blockcopolyetherester prepared from:
60 mole % of terephthalic acid,
40 mole % of isophthalic acid,
98 mole % of ethylene glycol, and
2 mole % of polyoxyethylene glycol (A.M.W.: 4,000)

The polyoxyethylene-ester part represents 30.51% by weight of the blockcopolyetherester.

In a reaction tube provided with a distillation consensor and a stirring system were introduced:
18.1 g (0.096 mole) of dimethylterephthalate,
12.43 g (0.064 mole) of dimethylisophthalate,
21.81 g (0.352 mole) of ethylene glycol, and
26.67 mg of $Ti(OOC\text{-phenylene-}COOCH_3)_4$ The mixture was heated for 2 h at 196° C. under nitrogen atmosphere. During the re-esterification reaction methanol was distilled off. Thereupon 12.8 g (0.0032 mole) of polyoxyethylene glycol (A.M.W.: 4,000) was added. The temperature was raised to 255° C. in a period of 30 min and kept at that temperature for 15 min while maintaining the reaction mixture under $N_2$-atmosphere. The polycondensation was continued under reduced pressure lower than 0.5 mm Hg at 282° C. for a period of 30 min to 3 h depending on the viscosity of polymer desired.

PREPARATION 6 (compound for use in comparative Example 1)

Blockcopolyetherester prepared from:
53 mole % of terephthalic acid,
40 mole % of isophthalic acid,
7 mole % of 5-sulpho-isophthalic dimethylester sodium salt,
100 mole % of ethylene glycol The blockcopolyetherester contains no polyoxyethylene-ester part.

In a reaction tube provided with a distillation consensor and a stirring system were introduced:
20.564 g (0.106 mole) of dimethylterephthalate,
15.52 g (0.08 mole) of dimethylisophthalate,
4.144 g (0.014 mole) of 5-sulpho-isophthalic dimethylester sodium salt,
27.28 (0.44 mole) of ethylene glycol, and
8.8 mg ($4 \times 10^{-5}$ mole) of zinc acetate dihydrate.

The mixture was heated for 3 h at 196° C. under nitrogen atmosphere. During the trans-esterification reaction methanol was distilled off. After 3 h the temperature was raised to 255° C. in a period of 30 min. and kept at that temperature for 15 min while maintaining the reaction mixture under nitrogen atmosphere.

The polycondensation was continued under reduced pressure lower than 0.5 mm Hg at 255° C. for a period 3 h.

The inherent viscosity of 0.5 wt % solution measured at 25° C. in a mixture of phenol and orthochlorobenzene (60/40 by volume) was 0.25 dl/g.

For use according to the present invention the selected blockcopolyetherester compound(s) can be present as dispersed particulate material in a binder layer but is (are) preferably used to form in a continuous layer, either alone or in admixture with a hydrophilic colloid.

According to one suitable procedure, the selected copolyetherester is (are) applied in layer-form by dissolving them in an organic solvent, e.g. a chlorinated hydrocarbon solvent such as methylene chloride and/or 1,2-dichloro ethane, and evaporating the solvent after coating.

According to an other procedure the copolymer is (are) applied from an aqueous dispersion, i.e. as a latex, which may be prepared by introducing the copolyetherester in powder form, optionally together with a dispersing agent, into water and raising the temperature above the glass transition temperature with stirring till a latex is obtained containing dispersed particles sizing up to 1,500 nm.

As an example the copolyetherester of preparation 4 was dispersed in water to prepare a latex in the following manner:

10 g of said blockcopolyetherester in the presence of 200 mg of 2,4,6-(isobutyl)-1—$(OCH_2-CH_2)_7$—$OSO_3Na$ benzene as dispersing agent were stirred at 95° C. for 3 h in 150 ml of water. After cooling down to 20° C. the fairly viscous oil was filtered and water was added up to a volume of 200 ml. The obtained latex particles had an average particle size of 1100 nm and were used lateron in the preparation of coating A4 of Example 1.

By applying the above defined blockcopolyetherester compounds on an unsubbed polyethylene terephthalate support at a dry coating thickness of 0.25 μm a surface resistivity lower than $700 \times 10^{10}$ Ohm per square can be obtained at a relative humidity of 30%.

The surface resistivity of a coating antistatic layer is measured by a test proceeding as follows:

After coating the resulting layer is dried and conditioned at a specific relative humidity. The surface resistivity measurement is performed by placing two conductive copper poles having a length of 1.0 cm parallel to each other at a distance of 1 cm forming a square inbetween and measuring the resistance built up between said electrodes with a precision Ohm-meter.

The above defined blockcopolyetherester compounds can be used, e.g. in the production of layers on resin, paper or resin-coated paper supports.

We have found by experiment that an antistatic layer containing one or more of the above defined blockcopolyetheresters provides antistatic properties not only when applied as an exterior layer but even when applied underneath a hydrophilic colloid layer, e.g. a layer containing gelatin. This is a very important and surprising discovery. The conductivity of the antistatic layer, attributable to the blockcopolyetherester, is sufficient to have a significant antistatic effect, given the small distance between induced surface charges and the antistatic layer (say 4 to 10 $\mu$m), and the dielectric properties of the hydrophilic colloid layer. The intrinsic conductivity of the antistatic layer can be attributed to the mobility of the electron-transfering polyether chain parts in the blockcopolyetherester.

As already stated, an important use for the invention is in the manufacture of recording materials comprising one or more recording layers on a hydrophobic resin or resin-coated support. The defined antistatic compounds are particularly beneficial for forming one or more antistatic layers in photographic materials containing at least one silver halide emulsion layer, and in image-receiving materials as used in conjunction therewith in the production of diffusion transfer images e.g. obtained by silver complex diffusion transfer or dye diffusion transfer. In a recording material, a said antistatic layer can be formed on top of the recording layer(s) provided the permeability and mechanical properties of such antistatic layer are satisfactory. However in the preferred embodiments of the invention, a layer containing at least one of the above defined blockcopolyetherester compounds is used as an under-layer (subbing layer) for a recording layer, e.g. a silver halide emulsion layer, in direct contact therewith.

A web or sheet according to the invention can incorporate more than one antistatic layer, each incorporating one or more blockcopolyetheresters as herein defined. For example there may be one such antistatic layer on each side of the resin or resin-coated substrate. In that way a particularly high resistance to dust attraction and sparking can be achieved.

In certain embodiments of the invention a silver halide photographic material is provided at the rear side of the hydrophobic resin or resin-coated support (the side opposite the light-sensitive layer(s)) with an antistatic layer containing one or more pigments in admixture with the blockcopolyetherester(s). Use can be made of pigments having anti-reflecting properties and/or antistatic properties. For example such said layer can be an anti-reflecting layer, also called antihalation layer, e.g. containing carbon black which confers the anti-reflecting properties and further increases the conductivity of the layer. Such an anti-reflecting layer can be removed after image-development by a solvent or solvent mixture.

The present invention includes any polyester film material coated with an antistatic layer incorporating one or more of the blockcopolyetheresters. For photographic material a preferred polyester to the film forming support or substrate is polyethylene terephthalate. Although the Examples hereinafter set forth are directed to the coating of a polyethylene terephthalate film base, other polyester films may be used, e.g. polyesters resulting from the polycondensation of glycol or mixture of glycols, with terephthalic acid or mixtures of terephthalic acid with minor amounts of other dicarboxylic acids such as isophthalic acid, diphenic acid and sebacic acid. The polyester film may contain pigments or dyes and when used as base for X-ray film is, e.g., tinted blue.

The blockcopolyetherester solution or aqueous dispersion may be applied to a said polyester film support either before or after it has been stretched or oriented. Preferably, however, the solution or dispersion is applied after biaxially stretching the film, e.g. in the temperature range of from 80° to 100° C., the longitudinal stretch ratio being e.g. in the range of 2.5:1 to 4.0:1. The transverse stretching may be effected, e.g., at a ratio of 2.5:1 to 4.0:1. Thereupon the film is heat-set by heating in the range of 180° C. to 220° C. for 0.1 to 2 minutes while it is restrained from shrinkage in both directions.

If desired, adhesion-improving agents may be incorporated in the antistatic layer(s) in dissolved form, e.g. resorcinol, pyrocatechol, dihydroxytoluene, and chloral hydrate. Other ingredients, e.g. stretch-improving agents, sizing agents and friction lowering substances, e.g. waxes as described in U.S. Pat. No. 4,089,997 may be present in the antistatic layer.

Other useful ingredients that may be added are, e.g., surface-active coating agents, colloidal silica and embossing agents also called spacing agents, i.e. particles for creating microscopic protrusions of less than 3 $\mu$m, for obtaining a thin air space between the subbed material and a material touching it, e.g. during transport of the film. Such embossing agents can be known matting agents, e.g. those described in the published European Patent Application 79/200053.1 filed Jan. 30, 1979 by Agfa-Gevaert N.V.

An aqueous gelatin coating composition for forming a second layer on the subbing layer may in the case of photographic silver halide materials, contain plasticizers that are photographically inert and that have the property of making gelatinous layers stretchable without impairing their transparency as described, e.g. in the U.S. Pat. No. 3,988,157. In this respect are mentioned aliphatic polyhydroxy compounds such as glycerol, sorbitol, tri(beta-hydroxy-ethyl)-glycerol, 1,1,1-tri(hydroxymethyl)-propane, 2-nitro-2-ethyl-1,3-propanediol, 1,3-dichloro-2-propanol, 1,2,4-butanetriol, 3-hydroxymethyl-2,4-dihydroxypentane, 1,2,6-hexanetriol, 3-hydroxymethyl-4-hydroxyamyl alcohol, glycerol-aldehyde, glycerol dichlorohydrin, and mannitol.

Equally suitable compounds are caprolactam, N,N'-dimethylurea, resorcinol, pyrocatechol, and dichlorodiethyl ether. Other suitable plasticizers are aliphatic carboxylic or sulphonic acids such as malonic acid, glutaric acid, adipic acid, azelaic acid, sebacic acid, mono- and di-chloro-acetic acid, 1,2,3-propene-tricarboxylic acid, trimellitic acid, acrylic acid, methacrylic acid, maleic acid, fumaric acid, itaconic acid, and 2-sulpho-ethyl methacrylate; further aromatic acids such as phthalic acid, o-sulphobenzoic acid, o-nitrobenzoic acid, o-aminobenzoic acid, p-hydroxybenzoic acid, and salicylic acid.

Moreover, polymeric plasticizers can be added to the gelatin coating composition, e.g. latices of copolymers of butadiene and a lwoer alkyl ester of acrylic or methacrylic acid e.g. a copolymer of butadiene and methyl methacrylate containing 20–80% by weight of methyl methacrylate. These latices are described in the United Kingdom Pat. No. 1,053,043.

Hardening agents, spreading agents, antistatic or metal-complexing agents can also be added to the aqueous gelatin-containing coating composition. Suitable antistatic or metal complexing agents are the sodium salt of polystyrene sulphonic acid, alkali metal salts of co(styrene/maleic acid), inorganic salts such as sodium chloride, potassium chloride, and sodium orthosilicate, further citric acid, sulphosalicylic acid, 2,5-disulphohydroquinone, the sodium salt of ethylenediamine tetraacetic acid, ethanol-amino-diacetic acid, the sodium salt of N(o-hydroxybenzyl)-amino-diacetic acid, the monosodium salt of vanadic acid, 3,5-disulphopyrocatechol, phosphono-acetic acid, ethylene-1,2-diphosphonic acid, butylene-1,4-disphosphonic acid, and ascorbic acid.

Other possible ingredients for said layer are, e.g. surface-active coating aids, colloidal silica, and the already mentioned embossing agents.

After the film has been heat-set a photographic material may be formed by applying a light-sensitive layer such as a gelatino silver halide emulsion layer optionally directly to the antistatic primer layer. Preferably, however an underlayer or subbing layer as aforesaid, of a hydrophilic colloid mainly containing gelatin, is provided.

The photographic silver halide emulsion layer(s), when used, can be of any type of composition known to those skilled in the art. For examples of compositions, reference can be made, e.g. to Research Disclosure 17,643 of December 1978.

Apart from light-sensitive hydrophilic colloid layers any non-light-sensitive hydrophilic colloid layer may be combined with an antistatic layer containing the desired blockcopolyetheresters, e.g. a gelatin layer containing developing nuclei for use in the silver complex diffusion transfer process or a hydrophilic colloid layer containing a mordanting agent for use in a dye diffusion transfer process as described e.g. in Angew. Chem. Int. Ed. Engl. 22, (1983) p. 191-209.

By applying an antistatic layer containing the blockcopolyetheresters hereinbefore defined, problems caused by static charges can be avoided or substantially reduced. For example the formation of static charges by contact of a silver halide emulsion layer face with an emulsion layer face of an other silver halide emulsion material or the rear side of material or caused by friction with substances such as rubber and hydrophobic polymeric binder, e.g. the binder constituent of phosphor screens used as X-ray intensifying screens, can be markedly reduced by employing one or more antistatic layers in accordance with the present invention. The build up of static charges and subsequent dust attraction and/or sparking, e.g. during loading of films in cassettes, e.g. X-ray cassettes, or in cameras, or during the taking of a sequence of pictures as occurs in automatic cameras using X-rays films, can be avoided.

Although the described blockcopolyetheresters are particularly useful in the forming of antistatic layers applied in silver halide emulsion materials they are likewise useful in reducing surface resistivity of diazo-type composition materials, vesicular-image forming materials, magnetic recording materials, electrophotographic or electrophotographic recording materials and mounting or drafting film.

The following are (non-limiting) examples of materials according to the present invention and their manufacture. All percentages and ratios are by weight unless otherwise mentioned.

EXAMPLE 1

Separate strips of bi-axially oriented unsubbed polyethylene terephthalate supports having a thickness of 0.1 mm were covered by a known coating method with a 5% by weight solution in a 50/50 vol% mixture of dichloroethane and methylene chloride of one of the blockcopolyetheresters of preparations 1, 2, 3, 4, 5, and 6. The coated layers were dried at 45° C. forming materials A1 to A6 each having an antistatic layer of a thickness of 4 μm.

Materials B1, B2 and B3 were prepared by coating strips of the materials A1, A2 and A3 respectively at the antistatic layer side with a hydrophilic colloid layer applied from the following mixture at 30 m²/l:

| | |
|---|---|
| 10% aqueous gelatin solution | 80 ml |
| 33% aqueous dispersion of colloidal silica | 40 ml |
| caprolactam | 4 g |
| hexanetriol | 2 g |
| 10% aqueous solution of heptadecyl benzimidazole disulphonic acid disodium salt | 6 ml |
| methanol | 100 ml |
| water | 770 ml |

Materials C1, C2 and C3 were prepared by coating strips of said materials B1, B2 and B3 on the hydrophilic colloid layer side with a gelatin-silver halide emulsion layer suited for X-ray image recording in combination with fluorescent intensifying screens. The emulsion layer having a thickness of 3 μm contained 2.2 g of gelatin per sq.m. and the weight ratio of gelatin to silver halide (expressed in equivalent amount of silver nitrate) was 0.4/1.0. The silver halide emulsion layer was coated with a protective layer (anti-stress layer) containing formaldehyde hardened gelatin and having a thickness of 1.1 μm.

The surface resistivity of said materials was measured at 30% relative humidity (R.H.) and the results thereof are listed in the following Table 2.

For comparison purposes the surface resistivity of a double-side coated silver halide emulsion layer material suited for radiography with fluorescent intensifying screens but free from antistatic layers and containing no antistatic agents is mentioned in said Table 1 at E. The surface resistivity of an unsubbed polyethylene terephthalate support free from antistatic layer is mentioned at the bottom of Table 1 at P.

TABLE 1

| Material | Surface resistivity $10^{10}$ · ohm/sq. |
|---|---|
| A1 | 50 |
| A2 | 22 |
| A3 | 8.3 |
| A4 | 140 |
| A5 | 630 |
| A6 | 100,000 |
| B1 | 38 |
| B2 | 55 |
| B3 | 15 |
| C1 | 7.0 |
| C2 | 6.3 |
| C3 | 4.8 |
| E | 3,000 |
| P | 5,000 |

EXAMPLE 2

TEST 1

Material A3 of Example 1 is dipped into a 1N aqueous solution of hydrochloric acid and thereupon washed to neutral with demineralized water.

TEST 2

Material A3 of Example 1 is dipped into a 1N aqueous solution of sodium hydroxide and thereupon washed to neutral with demineralized water.

The surface resistivity values obtained before and afer carrying out said tests are listed in the following Table 2.

TABLE 2

| Test No. | Before test | After test |
|---|---|---|
| | Surface resistivity $10^{10} \times$ ohm/sq at 30% R.H. | |
| 1 | 8.3 | 8 |
| 2 | 8.3 | 36 |
| | Surface resistivity $10^{10} \times$ ohm/sq at 70% R.H. | |
| 1 | 0.017 | 0.018 |
| 2 | 0.063 | 0.080 |

We claim:

1. A sheet or web comprising a substrate which is composed of or coated with a hydrophobic resin and carries at least one antistatic layer, characterised in that the antistatic layer consists essentially of a blockcopolyetherester of dibasic carboxylic acid(s) esterified with ethylene glycol and with a polyoxyethylene glycol having an average molecular weight in the range 1,000 to 10,000, at least 75% by weight of such blockcopolyetherester being constituted by polyoxyethyleneester chain parts.

2. A sheet or web according to claim 1, wherein said blockcopolyetherester has been derived from terephthalic acid, isophthalic acid or a mixture thereof.

3. A sheet or web according to claim 1, wherein said sheet or web includes at least one said antistatic layer comprising at least one said blockcopolyetherester in particular form, dispersed in a binder.

4. A sheet or web according to claim 1, wherein said sheet or web includes at least one said antistatic layer formed by at least one said blockcopolyetherester.

5. A sheet or web according to claim 1, wherein there is a said antistatic layer on each side of the resin or resin-coated substrate.

6. A sheet or web according to claim 1, wherein said blockcopolyetherester contains a minor amount of sulpho groups in salt form.

7. A sheet or web according to claim 6, wherein from 5 to 10 mole % of the dibasic carboxylic acid or derivative thereof used in the preparation of the polyester part of the blockcopolyetherester is substituted by sulpho groups in salt form.

8. A sheet or web according to claim 1, wherein said sheet or web comprises a hydrophobic resin or resin-coated support bearing at least one said antistatic layer and at least one recording layer.

9. A sheet or web according to claim 8, wherein there is at least one said recording layer comprising a silver halide emulsion.

10. A sheet or web according to claim 8, wherein on one side of said substrate there is at least one recording layer and at the opposite side of said substrate there is a said antistatic layer comprising at least one said blockcopolyetherester and a pigment which gives such layer anti-reflecting properties.

11. A sheet or web according to claim 8, wherein a said antistatic layer is present as a subbing layer beneath a silver halide emulsion layer or a receiving layer for receiving a transfer image in a silver complex diffusion transfer or dye diffusion transfer process.

12. A sheet or web according to claim 11, wherein the subbing layer is present on a polyethylene terephthalate support.

* * * * *